United States Patent
Feller et al.

(10) Patent No.: US 7,832,758 B2
(45) Date of Patent: Nov. 16, 2010

(54) AIRBAG ARRANGEMENT

(75) Inventors: Jens Feller, Illerkirchberg (DE); Stefan Bannert, Ulm (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/453,289

(22) Filed: May 6, 2009

(65) Prior Publication Data

US 2009/0224517 A1 Sep. 10, 2009

Related U.S. Application Data

(63) Continuation of application No. PCT/EP2007/062992, filed on Nov. 29, 2007.

(30) Foreign Application Priority Data

Dec. 5, 2006 (DE) .................. 20 2006 018 701

(51) Int. Cl.
*B60R 21/16* (2006.01)

(52) U.S. Cl. .................... 280/728.2; 280/731; 280/732; 280/741; 280/742

(58) Field of Classification Search ............. 280/728.2, 280/731, 732, 741, 742
See application file for complete search history.

(56) References Cited

U.S. PATENT DOCUMENTS

| | | | | |
|---|---|---|---|---|
| 3,723,684 A | * | 3/1973 | Greenwood ............... 200/83 R |
| 5,058,919 A | | 10/1991 | Paquette et al. |
| 5,533,750 A | | 7/1996 | Karlow et al. |
| 5,566,853 A | * | 10/1996 | Schenker et al. ............ 220/581 |
| 5,645,298 A | * | 7/1997 | Stevens et al. .............. 280/741 |
| 5,683,105 A | * | 11/1997 | Jackson ...................... 280/737 |
| 5,700,028 A | | 12/1997 | Logan et al. |
| 5,855,392 A | * | 1/1999 | Simpson et al. ............. 280/731 |
| 5,876,060 A | | 3/1999 | Davidson et al. |
| 5,876,062 A | * | 3/1999 | Hock ......................... 280/736 |
| 6,131,946 A | * | 10/2000 | Castleman et al. .......... 280/731 |
| 7,390,018 B2 | * | 6/2008 | Ridolfi et al. ............... 280/731 |
| 2004/0178611 A1 | * | 9/2004 | Simpson ..................... 280/731 |
| 2006/0175816 A1 | * | 8/2006 | Spencer et al. ............. 280/731 |

FOREIGN PATENT DOCUMENTS

| | | |
|---|---|---|
| DE | 115 256 A1 | 9/1975 |
| DE | 25 25 208 | 1/1976 |
| DE | 88 02 687.6 | 6/1988 |
| DE | 39 06 175 A1 | 9/1989 |
| DE | 90 04 686 U1 | 8/1990 |

(Continued)

*Primary Examiner*—Toan C To
(74) *Attorney, Agent, or Firm*—Foley & Lardner LLP

(57) ABSTRACT

A housing for an airbag arrangement of a vehicle occupant protection device including at least two housing parts, each part including a side wall terminating in at least one connecting edge. The housing parts by way of the connecting edges lying contiguous with one another when the housing is closed. The housing also includes further comprises a passage opening for an electrical connection lead to be connected to a component of the airbag arrangement, said opening being formed in the side wall of one of the housing parts at an interval from the or each connecting edge. The housing includes an access opening, formed in the side wall of a housing part and running from the connecting edge to the passage opening, through which an electrical connection lead aligned at an angle to the side wall.

24 Claims, 3 Drawing Sheets

FOREIGN PATENT DOCUMENTS

| | | |
|---|---|---|
| DE | 691 03 581 T2 | 12/1991 |
| DE | 197 50 945 A1 | 6/1998 |
| DE | 299 00 087 U1 | 5/1999 |
| DE | 199 15 159 A1 | 10/2000 |
| DE | 201 16 012 U1 | 1/2002 |
| DE | 100 59 992 A1 | 6/2002 |
| DE | 202 07 400 U1 | 10/2002 |
| DE | 10 2004 006 319 A1 | 9/2005 |
| DE | 10 2005 031 108 A1 | 1/2006 |
| DE | 20 2005 019 375 U1 | 3/2006 |
| DE | 20 2005 020 718 U1 | 7/2006 |
| EP | 0 461 757 B1 | 8/1994 |
| GB | 2 396 336 B | 6/2004 |
| WO | WO 2004/075366 A1 | 9/2004 |

* cited by examiner

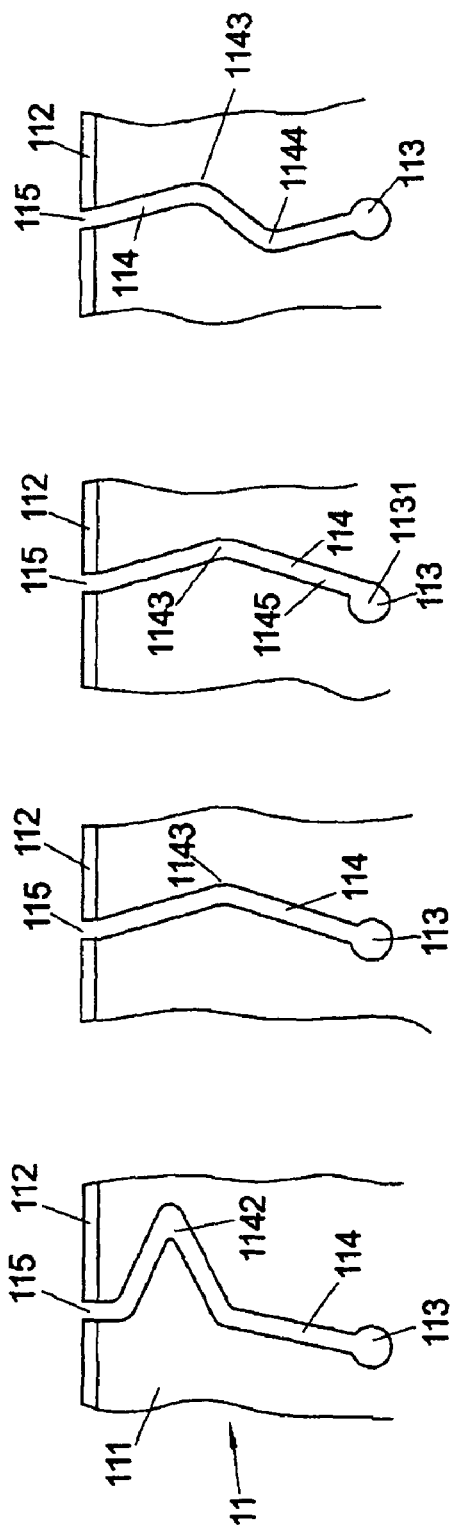

AIRBAG ARRANGEMENT

CROSS-REFERENCE TO RELATED PATENT APPLICATIONS

This application is a Continuation of US Application PCT/EP2007/062992, filed Nov. 29, 2007, which was published in German as WO 2008/068188 and is incorporated herein by reference in its entirety.

BACKGROUND

The present application relates to a housing for an airbag arrangement of a vehicle occupant protection device.

DE 197 50 945 A1 (incorporated by reference herein) discloses an airbag module for an occupant protection device having a housing to accommodate components of the protection device. Specifically an inflatable airbag and a gas generator for inflating the airbag are arranged in the housing. The gas generator is triggered by ignition electronics, which are situated outside the housing and to which the gas generator is connected via an ignition cable. The gas generator has an electrical connection to receive a connector of the ignition cable.

In order to connect the ignition cable to the gas generator situated in the housing, the housing has a passage opening for the ignition cable, through which the ignition cable is led into the interior of the housing. The opening has a diameter which will also allow the ignition cable connector to be drawn through the passage opening. Nevertheless, drawing the ignition cable through the passage opening in order to fit the ignition cable is awkward.

Another known way of allowing an ignition cable to be fitted to a gas generator situated in a housing is to have a section of the gas generator, in which the ignition cable connection is located, protruding from the housing, so that the connection for inserting the ignition cable connector is accessible from outside. This variant has the particular disadvantage that an ignition cable connected to the gas generator by way of a connector can be accidentally pulled out of the gas generator (perhaps even during the assembly of the airbag arrangement).

The object of the present invention is to create a housing for an airbag arrangement that affords an easy way of reliably connecting an electrical connection lead to a component of the airbag arrangement.

SUMMARY

One disclosed embodiment of the invention relates to a housing for an airbag arrangement of a vehicle occupant protection device. The housing comprises at least two housing parts, each comprising a side wall terminating in at least one connecting edge, the housing parts by way of the connecting edges lying contiguous with one another when the housing is closed. The housing further comprises a passage opening for an electrical connection lead to be connected to a component of the airbag arrangement, said opening being formed in the side wall of one of the housing parts at an interval from the or each connecting edge. The housing further comprises an access opening, formed in the side wall of this housing part and running from the connecting edge to the passage opening, through which access opening an electrical connection lead aligned at an angle to the side wall can be introduced into the passage opening.

Another embodiment relates to an airbag module for a vehicle occupant restraint system. The airbag module comprises a housing as described above; a component arranged in the housing; and an electrical connection lead, which extends through the passage opening in the housing to the component.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 2A-2G show the access opening for the housing of FIG. 1 according to exemplary embodiments.

DETAILED DESCRIPTION

Figure 1:
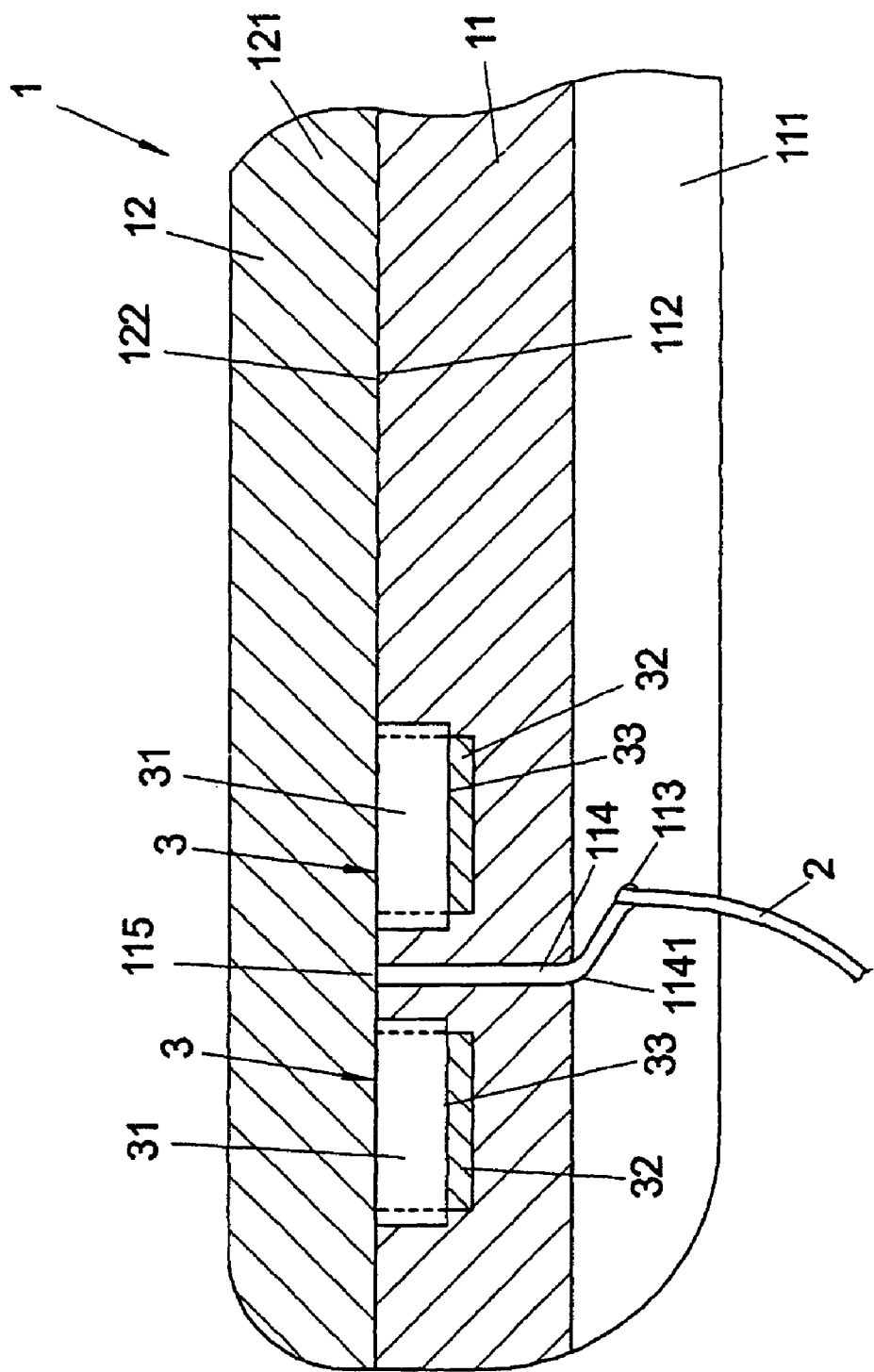
FIG. 1 shows a side view of a design variant of the housing according to the invention.

According to one exemplary embodiment, a vehicle includes a vehicle occupant restraint system including an airbag module. The airbag comprises a housing with at least two housing parts, each comprising a side wall terminating in a connecting edge. The housing parts lie with the connecting edges on top of each other when the housing is closed.

A passage opening is formed in the side wall of one of the housing parts at an interval from the connecting edge. The housing part comprising the passage opening for the electrical connection lead is preferably a lower shell of a modular housing (an airbag module), whilst the second housing part (for example the one not provided with a passage opening) is an upper shell of the modular housing. The upper shell covers off the airbag arrangement from the interior of the vehicle. If triggered, the unfolding airbag deploys through the upper shell (or more precisely through a tear area arranged in the upper shell) into the vehicle interior. In an airbag module fitted to a vehicle, the lower shell faces away from the vehicle interior.

The passage opening receives an electrical connection lead to be connected to a component of the airbag arrangement. An access opening is formed in the side wall of this housing part and runs from the connecting edge to the passage opening. The electrical connection is introduced through the access opening and into the passage opening to be aligned perpendicular to the side wall.

The electrical connection lead extends through the passage opening in the housing to a component. The component is primarily a gas generator, which inflates an inflatable airbag arranged in the housing. The electrical connection lead, which extends through the passage opening in the housing to the gas generator, is in this case the ignition cable for triggering the gas generator, coupling the gas generator to ignition electronics. It may also be some other electrical cable, for example, which connects another component of the airbag arrangement (also in addition to the ignition cable, for example) to a device (such as a control system) situated outside the housing.

The electrical connection lead can be easily introduced into the passage opening through the access opening formed in one of the housing parts of the housing, thereby eliminating the awkward act of drawing the electrical connection lead through the passage opening. The access opening in the side wall creates an access to the passage opening from the connecting edge, via which the housing parts (after introduction of the electrical connection lead) can be connected together when closing the housing. In particular, an electrical connection lead previously made up with a connector can also be rapidly and easily fitted via the access opening.

Running a ready made-up electrical connection lead through a passage opening into the housing moreover affords an efficient means of reducing the drag on the electrical connection lead. The invention therefore facilitates fitting of the electrical connection lead without having to dispense with an efficient cable drag relief.

The disclosure is obviously not confined to one single passage opening and one single access opening, it being possible to provide any number of these openings, as necessary, and in both housing parts. However, preferably only one of the housing parts comprises a passage opening.

It should be understood that the passage opening does not adjoin the connecting edge in the form of a semicircle or a circular segment, but is arranged at an interval therefrom and is connected to the connecting edge by way of the access opening in the side wall. In a preferred embodiment of the invention the passage opening is of fully circular design shape. The access opening is furthermore preferably embodied in the form of a slot. The slot extends in a main direction and is of a small width compared to its length extending in the main direction. According to one exemplary embodiment, the slot may be of elongate design. According to other exemplary embodiments, the slot may also follow a curved or indented course, for example.

The access opening generally runs between the connecting edge and the passage opening, preferably in an approximately straight line. Access openings following different courses (especially when embodied as a slot), such as a meandering course, for example, are naturally also feasible, however, depending on the specific design of the housing and/or the airbag arrangement.

In an especially preferred embodiment, the access opening is designed so as to prevent an electrical connection lead, introduced into the passage opening, being drawn out of the housing part through the access opening and/or so that the access opening counteracts the withdrawal. For this purpose the access opening may, as mentioned, be of curved or meandering shape, for example, at least in sections.

The access opening in this embodiment of the invention runs so that a tensile force acting on the electrical connection lead in the direction of the connecting edge is at least partially counteracted by sections of the side wall defining the access opening. This prevents the electrical connection lead being drawn out of the passage opening and out of the access opening. Many courses of the access opening, including an indented course, for example, are feasible for this purpose.

The side wall is provided with a stabilizing structure in the area of the access opening (i.e. especially along the access opening, where this is of slotted or elongate design). This stabilizing structure may be formed, for example, by a thickening of the side wall in the area of the access opening. In addition, it is possible to arrange one or more webs or a bead in the area of the access opening (along or perpendicular thereto) for the purpose of stabilization. In particular, the stabilizing structure is designed so that, when inserting an electrical connection lead through the access opening or when a force acts on an electrical connection lead introduced into the passage opening, the side wall is scarcely bent. Stabilizing the side wall ensures a stable guidance of the electrical connection lead in the passage opening and/or when inserting the electrical connection lead through the passage opening. The stabilizing structure preferably interacts with a cable drag relief, in order to counteract any bending of the side wall due to any force transmitted from the cable drag relief to the side wall.

In an especially preferred embodiment the housing parts of the housing are arranged so that they adjoin one another with their connecting edges, so as to prevent the electrical connection lead being drawn out of the housing part through the access opening formed therein. Various possible ways of connecting the housing parts will be known to the person skilled in the art, such as hooking, clipping, screwing, adhesive bonding or welding, for example. One connection point (for example a screw, adhesive bond or spot weld) is preferably situated in the area of the access opening, that is to say in the area where the access opening passes through the connecting edge, so as to produce an especially firm connection of the housing parts in this area and to prevent the electrical connection lead slipping out of the access opening. In one section the housing parts may be articulated (e.g. integrally joined) to one another by means of a hinge.

In an especially preferred development of the airbag module, the access opening is a slot having a width, measured transversely to the main direction of the slot. The slot may be smaller or larger than the outside diameter of the electrical connection lead.

A smaller diameter creates an interference fit with the electrical connection, reducing the likelihood the electrical connection situated in the passage opening will slip out into the access opening, or slip out of the access opening. When introducing the electrical connection lead through the access opening into the passage opening, it is "squeezed through" the access opening, an action which is facilitated, for example, by a correspondingly flexible outer sheathing (insulation) of the electrical connection lead.

If the width of the access opening is greater than the outside diameter of the electrical connection lead, the connection lead can be easily inserted into the passage opening and therefore makes fitting especially easy. The electrical connection lead can in this case be prevented from slipping out of the passage opening through the access opening by other measures, in particular through sufficiently firm connection of the two housing parts.

In a further embodiment of the module a continuous retaining element is arranged over the access opening to prevent the electrical connection lead being drawn out of the housing part through the access opening. This is especially important when fitting the electrical connection lead in the housing part, in order to prevent the electrical connection lead slipping out of the housing part. In addition, the retaining element may be arranged so that it exerts a tensile force on the sections of the side wall defining the access opening, so that the width of the access opening diminishes, thereby additionally serving to prevent the electrical connection lead slipping out of the passage opening or through the access opening.

The airbag module as described above not only permits rapid and easy fitting of the electrical connection lead but also allows for the arrangement of a cable drag relief structure, which prevents the electrical connection lead being drawn out of the housing in a direction parallel to the direction in which the electrical connection lead extends. In addition, the contour of the passage opening may here be adapted to the cable drag relief mechanism.

According to an exemplary embodiment, a cable drag relief structure is an element arranged on the electrical connection lead and on the edge of the passage opening. For example, this structure may be a thickening, separately formed or integrally formed with the sheathing of the electrical connection lead, for example in the form, of a ball or a cone. According to another exemplary embodiment, the cable drag relief is formed as a radial indentation in the electrical connection lead, in which the edge of the passage opening engages.

In addition, other known cable drag relief means may naturally be used together with the housing according to the invention, such as cable ties, for example. It is in principle possible to arrange the cable drag relief structure in the housing and outside the housing (e.g., on both sides of the passage opening). This is possible in the case of cable ties and clipping devices, for example.

The invention is described in more detail hereinafter with reference to exemplary embodiments; by way of example. In the figures, for the sake of clarity, the same reference numerals are always used for identical or comparable components.

FIG. 1 shows a side view of a housing 1 for an airbag arrangement. The housing 1 has a first housing part 1 embodied as a lower shell 11, adjoining which is a second housing part embodied as an upper shell 12. The lower shell and the upper shell each have a side wall 111, 121, which each terminate in a connecting edge 112, 122. In other words, the edge of the side walls 111, 121 is formed as connecting edge, the two housing parts 11, 12 being connected together via the connecting edges 112, 122 lying on top of each other.

A passage opening 113 is formed in the lower shell 11, through which an electrical connection lead in the form of an ignition cable 2 of ignition electronics (not shown), situated outside the housing 1, extends into the interior of the housing 1, where it is connected to a gas generator (not shown). The passage opening 113 is connected to the connecting edge 112 via an access opening in the form of a slot 114, formed in the side wall 111, so that the slot 114 in the connecting edge 112 forms an access 115, through which the ignition cable 2 could be fitted by inserting it into the slot 114 and introducing it through the slot 114 into the opening 113.

The slot 114 has a curvature 1141, which makes it more difficult to accidentally pull the ignition cable 2, situated in the passage opening 113, out through the slot 114 (for example, whilst assembling the housing). Pulling the ignition cable 2 out of the slot 114 through the passage 115 formed in the connecting edge 112 is also prevented, once the housing is assembled, in that the connecting edge 122 of the upper shell 12 is firmly connected to the lower shell 11, resting on the connecting edge 112 thereof in the area of the passage 115.

In order to firmly connect the upper shell 12 to the lower shell 11, particularly in the area of the slot 114 and the access 115, a connecting structure in the form of two clip connections 3, which are attached to the outside of the housing 1 on both sides of the slot 114, is provided in the area of the slot 114. The clip connections 3 each have a first structure 31, which is connected to the upper shell 12 and which partially overlaps a second structure 32 applied to the lower shell 11, and is latched to a retaining structure 33 likewise arranged on the lower shell 11.

FIGS. 2a to 2g represent various design variants of a slotted access opening and a passage opening. As in FIG. 1, the slots 114 shown in these figures are formed in a side wall 111 of a lower shell 11. According to various exemplary embodiments, multiple slots, including ones of a different configuration, can naturally also be arranged together in one housing part or in all housing parts of the housing. Moreover, all possible combinations of features of the slots and passage openings represented in FIGS. 2a to 2g are obviously also possible.

The slot 114 in FIG. 2a connects a passage opening 113 to an access 115 formed in a connecting edge 112 of the side wall 111. In proximity to the connecting edge 112, the slot 114 has an indented structure 1142. The structure 1142 is intended to prevent a cable (not shown), situated in the lower part of the slot 114 and in the passage opening 113, from slipping out when a force is exerted on the cable in a direction from the opening 113 towards the connecting edge 112.

In FIG. 2b the slot 114, instead of an indentation, has a curvature 1143, which is likewise intended to prevent a cable slipping out of the slot 114, but which at the same time, in contrast to an indented course, makes it easier to insert a cable through the slot 114.

The slot 114 in FIG. 2c corresponds to the slot 1114 in FIG. 2b. Here however, the slot 114 does not open radially into the circular passage opening 113, but enters it laterally offset, that is to say the center line of the end section 1145 of the slot 114 facing the passage opening 113 does not run through the center 1131 of the passage opening 113.

In the exemplary embodiment in FIG. 2d the slot 114 has a meandering course with two curvatures 1143 and 1144 pointing in opposite directions.

FIGS. 2e and 2f show variants in which a retaining element 116 is arranged on an end section 1145 of the slot 114 facing the passage opening 113. The retaining element 116 serves to prevent a cable inserted into the passage opening 113 from slipping out through the slot 114 to the access 115 in the connecting edge 112, and thereby to prevent the cable slipping out of the lower shell 11. At the same time the retaining part may be so formed and arranged over the slot that the width d of the slot narrows, thereby affording additional safeguard preventing a cable in the passage opening 113 from slipping out.

The retaining element 116 spans the slot 114 and at two sections 1161 and 1162 is connected to the slot 114 at sections of the side wall 111 defining opposite sides. Various methods of connection are possible for connecting the retaining element 116 to the side wall 111, such as adhesive bonding, welding or screwing, for example. A special variant of the fixing of the retaining element 116 is shown in FIG. 2f, in which the retaining element 116 is connected to the side wall 111 by a clip connection 1163.

The side wall 111 represented in FIG. 2g has a stabilizing structure 1111 in the area of the passage opening 113. The stabilizing structure 1111 takes the form of a thickening of the side wall 111 extending radially around the opening 113. Such a thickening may additionally be reinforced by webs extending radially in relation to the opening 113. Such stabilizing structures are, in particular, integrally formed with the side wall 111.

FIGS. 3a to 3i show various possible ways of applying a cable drag relief in the area of the passage opening, in order to secure a cable arranged in the passage opening to prevent it being accidentally pulled out (in the direction of the cable). Each figure shows a section through the side wall 111. In each case a cable 2 extends through a passage opening 113 in the side wall 111.

Figure 3E:
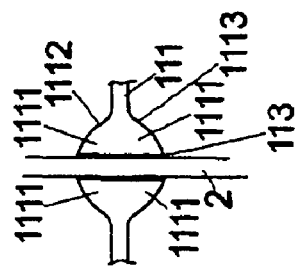
FIGS. 3A-3I show the cable drag relief for the housing of FIG. 1 according to exemplary embodiments.
Figure 3D:
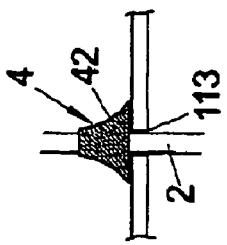
Figure 3C:
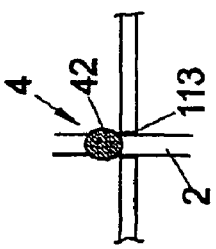
Figure 3B:
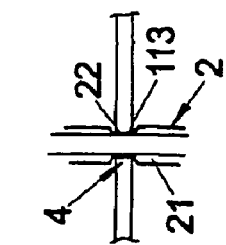
Figure 3A:
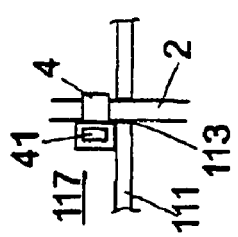

In the variant in FIG. 3a a cable tie 41 is arranged as cable drag relief structure 4 in the interior 117 of the housing 11. The cable tie 41 is firmly connected to the cable 2 and rests on the edge of the passage opening, thereby preventing the cable 2 being pulled out of the housing in the direction of the cable.

The cable 2 in the variant according to FIG. 3b has a sheathing 21, which has a crease-like indentation 22 in the area of the passage opening 113. The indentation 22 means that in the area of the passage opening 113 the cable 2 has a diameter which is approximately equal to or smaller than the diameter of the passage opening 113, whereas the cable outside the passage opening has a larger diameter. The edge of the passage opening 113 engages in the indentation, thereby fixing the cable 2 in its longitudinal direction inside the passage opening 113.

FIGS. 3c and 3d show further variants of the cable drag relief, according to which an element in the form of a bead-like thickening 42, resting on the edge of the passage opening 113, is arranged on the cable 2 on the inside of the side wall 111. The thickening 42 may be applied to the cable sheathing by means of a resinous or adhesive substance, for example, or pushed onto the cable as a sleeve, for example. The thickening 42 in FIG. 3c is spherical, that in FIG. 3d taking the form of a truncated cone.

The variant in FIG. 3e shows a side wall 111, which in the area of the passage opening 113 has bead-like thickenings 1111, which act as stabilizing structures, on both sides (that is to say towards the inside 1112 and towards the outside 1113). Such thickenings may also be formed on one side only, for example towards the inside 1112 only (FIG. 3f or towards the outside 1113 only (FIG. 3g). According to FIGS. 3f and 3g a further cable drag relief mechanism, in the form of a cable tie 41, for example, may additionally be arranged in the area of the passage opening 113 (that is to say in the area of the bead-like thickening 1111).

A stabilizing structure may also be formed in the area of the passage opening 113 (and/or also in the area of the slot 114) in that the side wall 111 has a particular course, for example in the form of an arch 1115 (FIG. 3h) oriented towards the inside 117 of the lower shell 11, which is greatest in the area of the passage opening 113 (that is to say it is most heavily indented at this point in relation to the side wall 111).

Figure 3I:
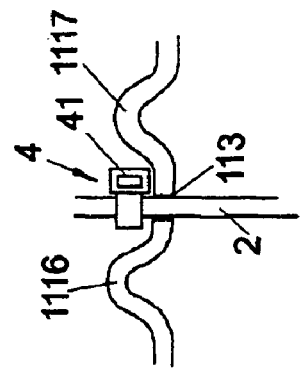
Figure 3H:
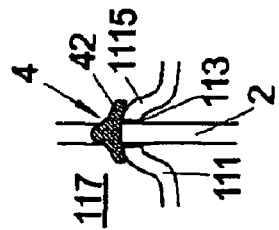
Figure 3G:
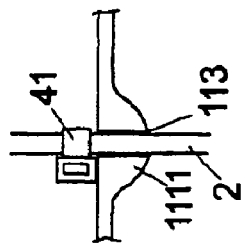
Figure 3F:
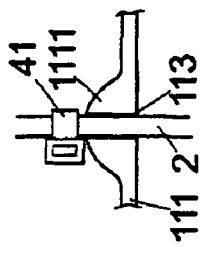

Another variant of an arch as stabilizing structure is shown in FIG. 3i, according to which two arches 1116 and 1117 extend on opposite sides of the passage opening 113. In addition to the stabilizing structures in the form of arches shown in FIGS. 3h and 3i, cable drag relief means 4 may also be provided in the form, for example, of a thickening 42 (FIG. 3h) or in the form of a cable tie 41 (FIG. 3i).

The variants of the passage opening, the slot and cable drag relief shown in FIGS. 2 and 3 may obviously also be embodied in combinations, which are not represented in the drawings. In particular, the cable drag relief mechanisms and stabilizing structures in FIG. 3 may be combined with the variants of the slot and the passage opening represented in FIG. 2.

The priority application, German Patent Application No. 20 2006 018 701.4, filed Dec. 5, 2006 including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application.

What is claimed is:

1. A housing for an airbag arrangement of a vehicle occupant protection device, comprising
    at least two housing parts, each housing part including a side wall terminating in at least one connecting edge, the housing parts by way of the connecting edges lying contiguous with one another when the housing is closed;
    a passage opening for an electrical connection lead to be connected to a component of the airbag arrangement, the opening being formed in the side wall of one of the housing parts at an interval from the at least one connecting edge; and
    an access opening, formed in the side wall of the one of the housing parts and running from the connecting edge to the passage opening, wherein the electrical connection lead is aligned at an angle to the side wall and can be introduced into the passage opening via the access opening.

2. The housing as claimed in claim 1, wherein the housing parts are connected together at the connecting edges.

3. The housing as claimed in claim 1, wherein only one of the housing parts includes a passage opening.

4. The housing as claimed in claim 1, wherein the passage opening is approximately of fully circular design shape.

5. The housing as claimed in claim 1, wherein the access opening is a slot.

6. The housing as claimed in claim 1, wherein the access opening runs in an approximately straight line.

7. The housing as claimed in claim 1, wherein the access opening counteracts an electrical connection lead, introduced into the passage opening, being drawn out of the housing part through the access opening to the connecting edge.

8. The housing as claimed in claim 1, wherein the access opening follows a curved course, at least in sections.

9. The housing as claimed in claim 1, wherein the access opening follows a meandering course, at least in sections.

10. The housing as claimed in claim 1, wherein the access opening follows an indented course, at least in sections.

11. The housing as claimed in claim 1, wherein the side wall has a stabilizing structure in the area of the access opening and/or in the area of the passage opening.

12. The housing as claimed in claim 11, wherein the stabilizing structure is formed by a thickening of the side wall.

13. The housing as claimed in claim 11, wherein the stabilizing structure has a web or a bead arranged on the side wall.

14. An airbag module for a vehicle occupant restraint system, comprising
    a housing as claimed in claim 1;
    a component arranged in the housing;
    an electrical connection lead, which extends through the passage opening in the housing to the component.

15. The airbag module as claimed in claim 14, wherein the housing parts of the housing lie with their connecting edges on top of each other, so as to prevent the electrical connection lead being drawn out of the one housing part through the access opening formed therein to the connecting edge.

16. The airbag module as claimed in claim 14, wherein an inflatable airbag is arranged in the housing and the component is a gas generator for inflation of the airbag.

17. The airbag module as claimed in claim 16, wherein the electrical connection lead is an ignition cable, via which the gas generator can be connected to electronics arranged outside the housing for triggering the gas generator.

18. The airbag module as claimed in claim 14, wherein the access opening is of slot-like design and has a width, measured transversely to the main direction in which it extends, which is smaller than the outside diameter of the electrical connection lead or which is equal to the outside diameter of the electrical connection lead.

19. The airbag module as claimed in claim 14, wherein the access opening is of slot-like design and has a width, measured transversely to the main direction in which extends, which is greater than the outside diameter of the electrical connection lead.

20. The airbag module as claimed in claim 14, wherein a continuous retaining element, which prevents the electrical connection lead being drawn out of the housing part through the access opening to the connecting edge, extends over the access opening.

21. The airbag module as claimed in claim 14, wherein a cable drag relief structure interacts with the electrical connection lead, which prevents the electrical connection lead being drawn out of the housing in a direction parallel to the direction in which the electrical connection lead extends.

22. The airbag module as claimed in claim 21, wherein the cable drag relief structure comprises an element arranged on the electrical connection lead and bearing on the edge of the passage opening.

23. The airbag module as claimed in claim 21, wherein the cable drag relief structure comprises a radial indentation in the electrical connection lead, in which the edge of the passage opening engages.

24. The airbag module as claimed in claim 21, wherein the side wall in the area of the passage opening has a stabilizing structure, which counteracts any bending of the side wall under a force exerted on the side wall by the cable drag relief structure.

\* \* \* \* \*